G. ZINT.
AUTOMATIC SPRINKLER.
APPLICATION FILED SEPT. 18, 1911.
1,038,060.
Patented Sept. 10, 1912.
4 SHEETS—SHEET 1.
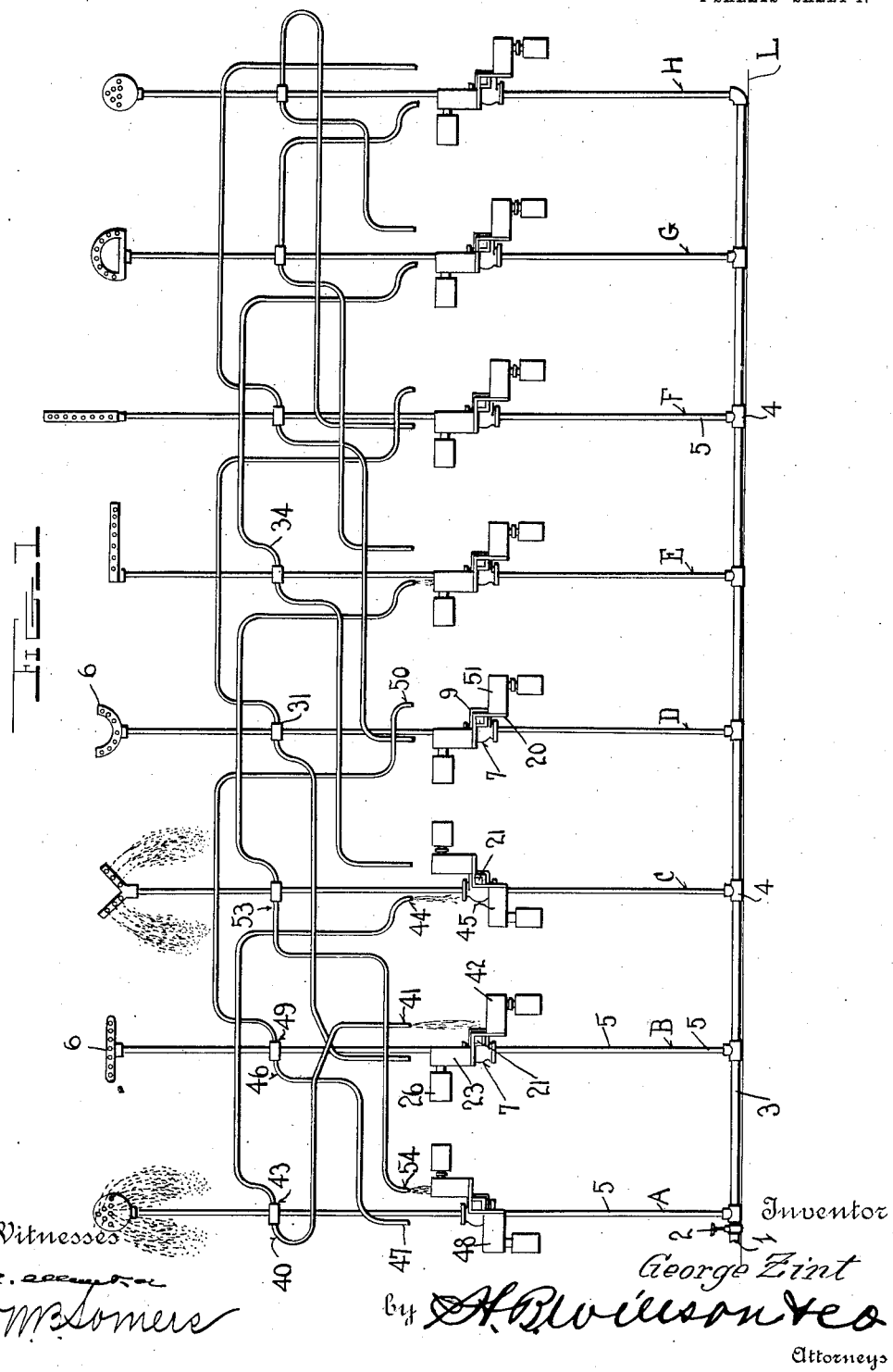
Witnesses
Inventor
George Zint
by H. B. Willson & Co.
Attorneys

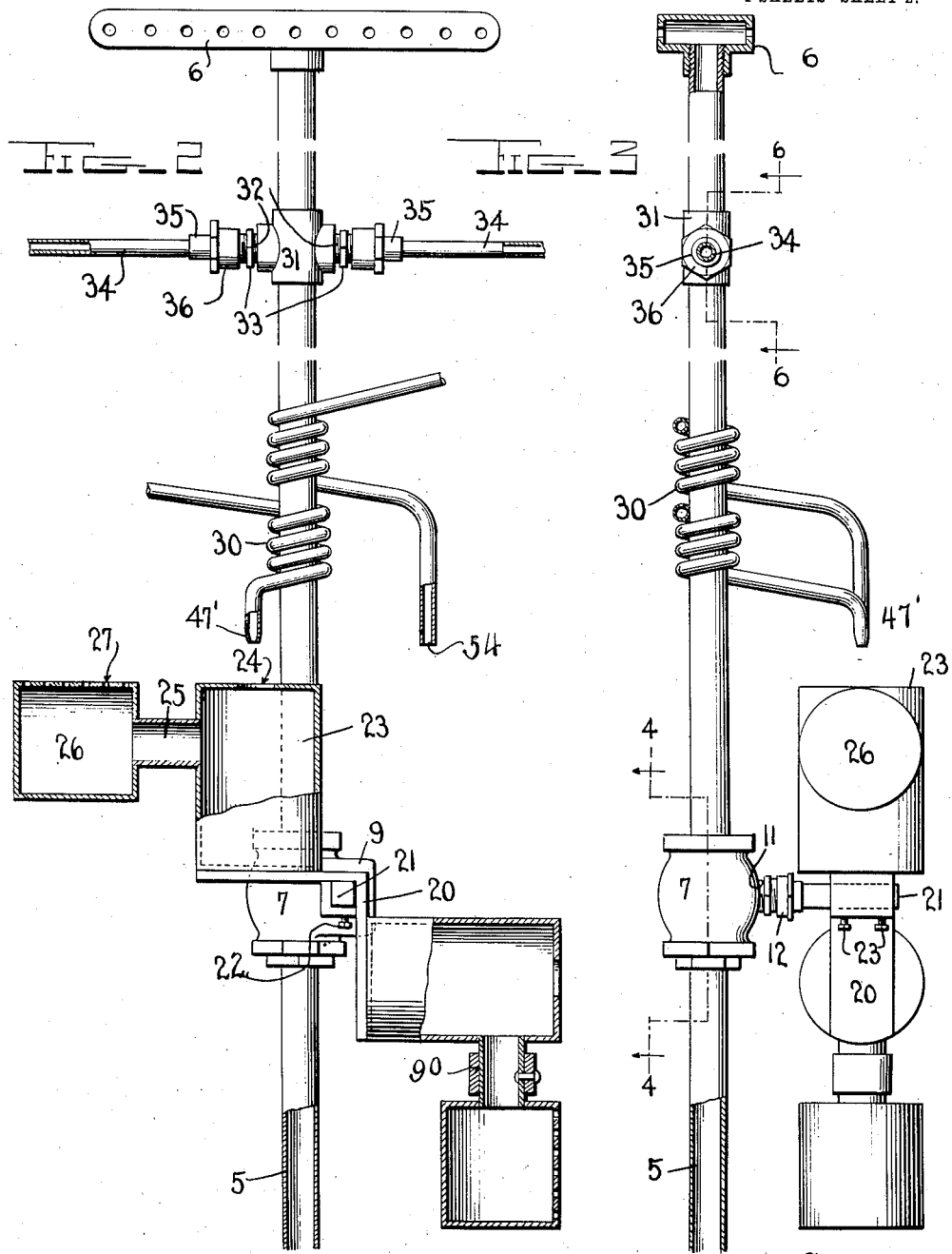

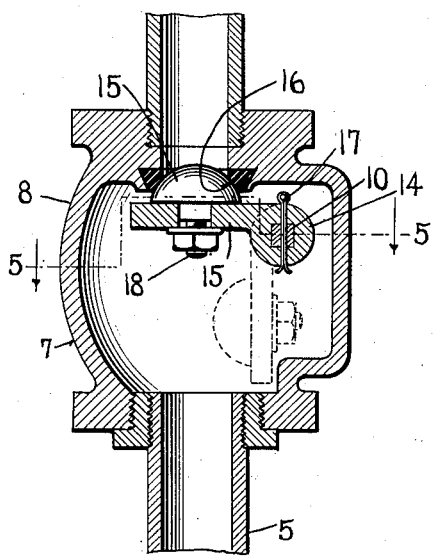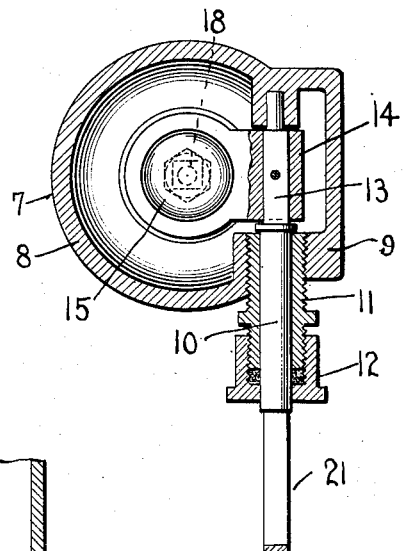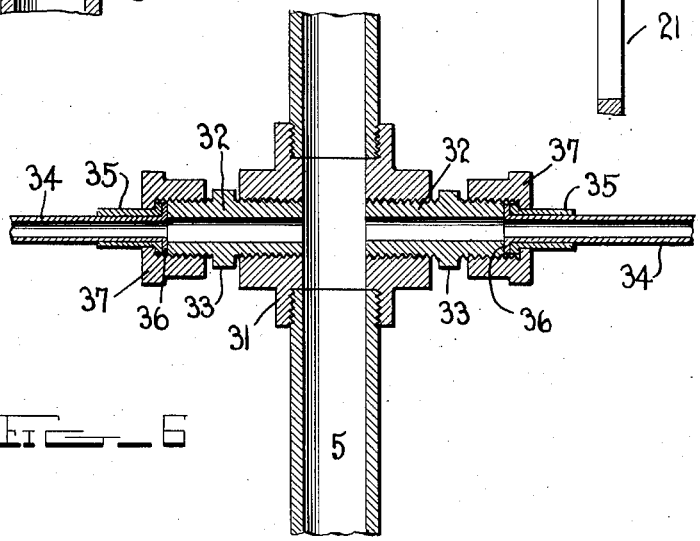

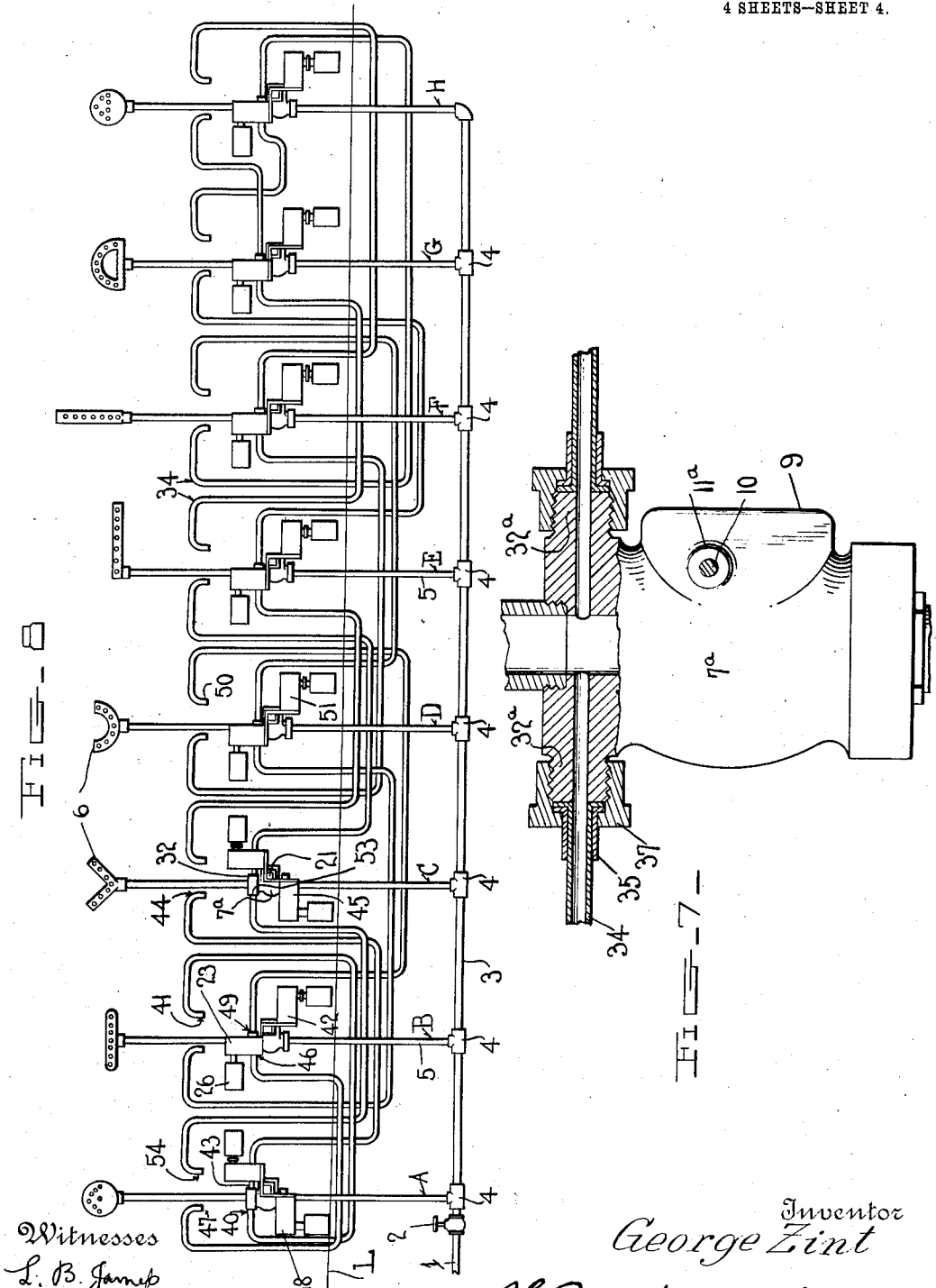

UNITED STATES PATENT OFFICE.

GEORGE ZINT, OF WAPAKONETA, OHIO.

AUTOMATIC SPRINKLER.

1,038,060.  Specification of Letters Patent.  Patented Sept. 10, 1912.

Application filed September 18, 1911. Serial No. 649,948.

*To all whom it may concern:*

Be it known that I, GEORGE ZINT, a citizen of the United States, residing at Wapakoneta, in the county of Auglaize and State of Ohio, have invented certain new and useful Improvements in Automatic Sprinklers; and I do declare the following to be a full, clear, and exact description of the invention, such as will enable others skilled in the art to which it appertains to make and use the same.

This invention relates to irrigation and sprinkling, and more especially to the systems thereof, and the object of the same is to construct a plant whereby a certain area (as for instance the owner's premises around his cottage) may be automatically sprinkled and yet an excessive use of water be avoided.

Various efforts have been made to produce automatic sprinkling devices as for use on lawns, in small or large gardens, and even on a larger scale for irrigation purposes, but the consistent defect which is common to all such systems as far as I am aware is that if the water from any type or form of nozzle is permitted to flow long enough it will inundate or flood the area which it reaches, and in order to avoid this most systems heretofore constructed contemplated human intervention at times and therefore did require attention. That is to say, either the size of the jets had to be regulated, the jets themselves cut off or turned on at times, or the rotary or other type of lawn sprinkler nozzle had to be moved on occasions so as to transfer its area of usefulness to a new spot.

My present invention contemplates the erection of a sprinkling system whose main or supply pipe is led around the user's premises and wherein standards rise from said main at intervals, each having a sprinkling head or nozzle at its upper end and a valve in its body, and means whereby the various valves are operated by the water pressure to open and to close the standards successively so that the sprinkling performed by their heads is intermittent. The following specification describes the preferred manner of carrying out this system, reference being had to the accompanying drawings wherein—

Figure 1 is a diagrammatic elevation showing eight such standards with different types of sprinkling heads or nozzles at their upper extremities, all connected with a single main or source of water supply, and the arrangement of valve-operating mechanism which forms an essential feature of my invention diagrammatically illustrated in connection therewith. Fig. 2 is an enlarged side elevation of the upper end of one of said standards, parts being broken away; Fig. 3 is an edge view of the same with parts of its head or nozzle broken away; Fig. 4 is an enlarged section on the line 4—4 of Fig. 3; Fig. 5 is a cross section on the line 5—5 of Fig. 4; Fig. 6 is an enlarged section on the line 6—6 of Fig. 3; Fig. 7 is a vertical sectional view, partly in section of a modified form of the valve of Fig. 4 which incorporates and includes the cross coupling shown in Fig. 6; and Fig. 8 is a diagrammatic elevation, much like Fig. 1, showing the use of this modified form of valve in connection with a number of standards whose buckets and control pipes are the same as in Fig. 1.

In the embodiment of my invention as illustrated in Figs. 1 to 6 of the drawings herewith, the numeral 1 designates a source of water supply, which in city districts would be some sort of a connection with the service pipe, and 2 is the main valve therein, the same controlling the flow of water along the main or supply pipe 3 of my improved system which in Fig. 1 is shown as straight but in practise will be led around the owner's premises or along those portions thereof which it is desired to have irrigated or sprinkled; and at various points in this main are T-couplings 4 from each of which rises a standard 5 which projects above the surface of the earth any suitable distance and carries a nozzle or sprinkler head 6 at its upper end. In Fig. 1 I have illustrated various forms or types of these nozzles or heads, but in practise one type only will probably be applied at the respective upper ends of all the standards 5. The latter are of ordinary water pipe, of a gage dependent upon the amount of water to be passed through them, and of a height and location consistent with the work to be performed. In the present instance I have shown a gang of eight such standards, which if disposed properly around a moderate sized garden or upon the lawn of the average suburban home will amply irrigate or sprinkle the same, but I do not wish to be limited to the number, size, or disposition of these standards, nor to the type of sprinkler head or nozzle employed.

Located at a suitable point within each standard is a valve 7, the preferred construction of which is best illustrated in Figs. 4 and 5. The casing 8 thereof has an internal offset 9 at one side through which the valve shaft 10 extends, the same being by preference mounted for rotation within a bushing 11 which is by preference threaded into the side of the offset 9 and closed by a packing gland 12 to prevent leakage. On the angular inner end 13 of the shaft is mounted the valve head 14 which by preference consists of a disk of metal having removably secured thereto a soft and convex facing 15 (as of rubber) adapted to close upward against the seat 16 (which also may be of rubber) when the shaft 10 is turned in the proper direction. When the shaft 10 is turned in the opposite direction, however, the valve head 14 assumes a vertical position within the offset 9 as seen in dotted lines in Fig. 4, and the water may flow upward through the standard and valve casing without interruption. By preference the valve head 14 is connected with the inner end of the shaft 10 removably, as by means of a cotter pin 17 or otherwise, so that it may be removed for repair when necessary; and similarly the facing 15 may be connected with the head 14 in any detachable manner, as by means of a bolt 18 as shown in Fig. 4. While I prefer this type of valve for use in systems where the water pressure is not excessive, I do not wish to be limited thereto and it is quite possible that other forms of valves may be adopted in high pressure localities. Each standard 5 of my improved system being thus provided with a valve, if now means be provided to open and close these valves at intervals and successively along the line of the system, it will be clear that the average volume of water may be utilized to sprinkle first one area and then another over the premises being irrigated. By my invention I perform this duty automatically or by the pressure of the water in a manner which will be explained below.

Referring now to Figs. 2 and 3, the numeral 20 designates a cross head secured upon the squared outer end 21 of the shaft 10 of each valve in any suitable manner, as by a set screw 22, and its two arms carrying buckets adapted alternately to be filled with water and emptied and so disposed with reference to each other that the weight of the water in one will overcome the weight of the other bucket so that the latter will ascend as the former descends, and vice versa. The preferred construction of this valve-operating mechanism contemplates a right-angular cross head 20 in the angle of which the squared end 21 of the shaft 10 is secured as shown in Figs. 2 and 3, and duplicate buckets carried by the two arms of said cross head. Each bucket, then, comprises a body 23 having an inlet 24 through that end which is remote from the arm of the cross head 20 upon which said body is secured, and an outlet 25 through the side of the body at right angles to the inlet and preferably leading to a sprinkling head 26 whose outlet perforations 27 are so placed that they open parallel with the inlet 24 of the body 23. The other bucket is similarly constructed, but the right-angular shape of the cross head 20 causes its parts to stand at right angles to the similar parts of the bucket already described. It follows that when the bucket at the right of Fig. 2 is discharging water through the perforations 27 from the interior of its head 26, which water is flowing out of its body 23 through the outlet 25, this bucket will be growing lighter and lighter as the water runs out; and meanwhile water may be passing into the inlet 24 of the other bucket and will not pass out its outlet 25 into its head 26 until it rises quite high in the body 23. When however, the water in the left-hand bucket in this view accumulates to such an extent that it is heavier than the water remaining in the right-hand bucket, the entire device will cant or tip through a quarter circle so that the shaft 10 will be rotated and the position of the valve thereon will be changed. The perforations 27 in the two roses or heads 26 are by preference disposed as shown in this view so as to trap the water which flows into an upright bucket and permit the latter to accumulate weight sufficient to turn the valve, and so as to exhaust the water from a bucket which has descended and permit it to sprinkle the lawn or garden in the vicinity of the standard 5, whereas the nozzle 6 at the upper end thereof will sprinkle the area around the standard and somewhat more remote therefrom. My system also contemplates the employment of a series of what may be called "control pipes" leading from one standard to another, and these may well be of lead pipe of small bore which can be conveniently coiled around the standards as shown at 30 or supported therefrom in any other suitable way.

In Fig. 6 is shown a cross coupling 31 let into each standard 5 above its valve 7, each lateral arm thereof receiving a threaded nipple 32 having a wrench hold 33 as best seen in Fig. 2. The fine lead pipe 34 at its end is passed through a sleeve 35 and upset at its extremity as at 36 against the end of the nipple, and over the sleeve and pipe is passed a gland nut 37 to make a close water-tight connection between the control pipe 34 and this arm of the coupling 31. In Fig. 7 the construction is substantially the same excepting that instead of a threaded nipple 32 screwed into the lateral arm of the cross coupling 31 I form a nipple 32ª which is integral with the valve casing 7ª and threaded at its outer end for reception of the gland nut 37 whereby the lead pipe 34 is connected therewith in a manner described above; and instead of employing a bushing 11 threaded into the offset 9 of the valve casing 8 as in Fig. 5 I form the casing with an integral boss 11ª in which the shaft 10 may turn. This construction combines in one element the valve and the cross coupling and therefore does away with the stretch of pipe between these elements in Fig. 1 and reduces the height of the standards as seen in Fig. 8; and this view is also made to illustrate how the control pipes may be disposed beneath the ground line indicated at L in both Figs. 1 and 8, although the course of the water through said pipe is the same in both diagrams and will now be described. A pipe 40 leads from the left-hand or first standard A to a point 41 above the right-hand or closing bucket 42 of the valve controlling mechanism connected with the second standard B, and a pipe 43 leads from the first standard past the second to a point 44 above the left-hand or opening bucket of the third standard C. In similar manner a pipe 46 leads from the second standard B back to a point 47 above the opening bucket 48 of the first standard, and another pipe 49 leads from this second standard past the third standard C to a point 50 above the closing bucket 51 of the fourth standard D. In like manner the control pipes are led from each standard forward and backward, one of them to a point above the opening bucket of another standard and the other to a point above the closing bucket of a third standard; and this disposition of the various control pipes is continued throughout the length of the series of standards. Without confusing the reader by a too detailed description, it may be said broadly that—except for the endmost standards of the series—each standard has its two control pipes led to opposite sides of two other standards respectively forward and backward of it so that water rising through the standard in question will be delivered out these control pipes at points above the buckets of said two other standards as long as its valve is open, and the disposition of the delivery ends of these control pipes is such that they will open or close the valves of the other standards one after another. While the arrangement of control pipes may be left to the user, in the diagrams I have shown standard A as controlling the valves in standards in B and C, standard C as soon as its valve is open controlling the valves in standards A and E, the latter as soon as its valve is opened controlling the valves in standards C and G, and so on down the line to the last standard H and then back again to control the valves in those standards which were omitted in the progress of the control from left to right. Finally when the control travels back from right to left, the standard B will be the last of the set affected, and its pipe 46 will deliver water at the point 47 above the left-hand bucket 48 of the standard A so that the latter has its valve again opened and the operation is repeated. However, as above suggested, I do not wish to be limited to this precise disposition of the control pipes, and of course the standards may be more or less in number than illustrated, as high as desired with any type of sprinkler heads 6, with the control pipes entirely above the ground line L as seen in Fig. 1 or beneath the same as indicated in Fig. 8, and with such other changes as may occur to the manufacturer or user and as come within the principle of this invention.

With the parts constructed substantially as above described, the operation of my improved system is as follows: The valve 2 being opened, communication is established between the service pipe 1 and the supply pipe 3, but as all the valves 7 will be closed at the beginning of the action of this system nothing will occur. The valve in the left-hand or first standard A must now be set open by hand as seen in Fig. 1 (and the same condition prevails in Fig. 8), water now passes up this standard out the sprinkler head 6 and sprinkles an area surrounding the same, and at the same time passes out its cross coupling at the points 40 and 43 and escapes at the points 41 and 44 as shown. From the point 41 it falls on the back of the closing bucket 42 and off the same onto the ground and does no harm; but from the point 44 it falls into the inlet 24 of the opening bucket 45 of the third standard C which soon becomes heavy and turns as shown on Fig. 1 (see the position of the bucket at the right of Fig. 2) so that the water escapes through the perforations 27 and sprinkles the lawn to a small degree, and in the act of turning it has opened the valve in the standard C. Water now begins to flow up through the standard C and out its sprinkler head, and through its cross coupling in opposite directions at the point 53, the left-hand control pipe delivering water at 54 into the right-hand or closing bucket of the first standard A. By preference the outlet end 47′ of the control pipe standing above the left-hand or opening bucket of every standard is reduced in some way so as to be smaller than the outlet end 54′ above the other or closing bucket thereof, as best seen in Fig. 2, and the result will be that as the water is more readily delivered above the closing bucket than it is above the opening bucket each valve so controlled will be cut off sooner than the other valve subject to the larger stream will be opened. In other words, when any standard begins to feed water through its control pipes forward and backward, that pipe which leads to a closing bucket and delivering a larger stream than the other pipe which leads to an opening bucket, will be more speedy in its action. The result when the control pipes are disposed as above described is that the water flows through standard A for say five minutes before its exit at the point 44 opens the valve on standard C, and the water flowing out at the point 41 does nothing to the valve on standard D because it falls on the back of the bucket 42; when the water begins to flow through standard C and its control pipes, after about five minutes that issuing at the point 54 will close the bucket on standard A whereas that issuing into the opening bucket in standard E will require longer to open the valve therein because its outlet end is contracted as just described. As soon as the valve in standard A is closed, the water ceases to issue from the points 41 and 44, the valve in standard B has not been affected, and there is now nothing to oppose the closing of the valve in standard C which in its turn will occur when the valve in standard E has been opened and the control pipe leading backward therefrom delivers into the closing bucket of standard C in a manner which will be clear. It follows that the restriction of the delivery of water through the control pipes into the opening buckets of the various valves, may be utilized to cause the said pipes from any standard to act more slowly in one direction than in the other. If a user find that his soil is of such nature that it requires considerable water, he may restrict the outlet from the control pipes above the closing buckets, and on the contrary if his soil does not need so much water he may restrict the other outlets. If the control pipes are of lead this can readily be done by pinching them with a suitable tool.

Attention is directed to the specific construction of the buckets shown in Figs. 2 and 3. The water issuing at the point 47' falls through the inlet 24 into the body 23 which fills up to the outlet 25, and it is my intention that at this time sufficient weight will have accumulated within said body to move the valve and change the position thereof. In doing so the bucket assumes the position shown at the left of Fig. 1 and the water in its body 23 flows through the outlet 25 into the rose or head 26 whence it passes out through the perforations 27 and is distributed over the ground in the immediate vicinity of the standard. Thus the emptying of the bucket is in itself utilized for sprinkling purposes, and water falling on the back of any bucket as seen in standard B in Fig. 1 will be spread over the ground as it splashes off the body 23; and therefore the heads 6 are intended to be of such construction that they will sprinkle a somewhat larger area, because all water fed through the control pipes to the buckets must eventually be dumped by the latter onto the earth. In Fig. 2 is shown a weight 90 which I preferably attach to the bucket on the right-hand or closing arm of the cross head 20 so that this arm will slightly overbalance that on the other side of the center of the shaft 21, and when such weight is used it will be clear that if all water runs out of the buckets they will assume the position shown in this view and the various valves on the several standards will remain normally closed. Enough water must accumulate within the left-hand or opening bucket to first overcome the weight added at 90, before the bucket will tilt to the opposite position. If this weight be just sufficient to counterbalance that of the valve itself as seen in Fig. 4, the entire cross arm 21, the buckets connected therewith and their heads 26, and the valve and weight will all be accurately poised, and the action of the whole mechanism will depend entirely upon the water delivered to the buckets from the control pipes. However, as above suggested, any suitable form of valve may be employed, and if that selected be of the type wherein the valve plug rotates on its own axis it will need no counterbalancing weight 90.

What is claimed as new is:

1. In an automatic sprinkling system, the combination with a series of upright standards, a feed pipe connecting their lower ends, and sprinkler heads at the upper ends of the standards; of a valve in each standard, opening and closing buckets carired by the valve stem at opposite sides thereof, and control pipes leading from each standard at a point above its valve, one to a point above the valve-closing bucket of another standard and the other to a point above the valve-opening bucket of a third standard.

2. In an automatic sprinkling system, the combination with a series of upright standards, means for feeding water to their lower ends, and sprinkler heads connected with their upper ends; of a valve in each standard, opening and closing buckets connected with the valve stem, and control pipes leading from each standard at a point between its valve and head, one to a point above the valve-closing bucket of another standard and the other to a point above the valve-opening bucket of a third standard, the last-named control pipe being restricted so that the flow of water therethrough will be slower, for the purpose set forth.

3. In an automatic sprinkling system, the combination with a series of upright standards, a feed pipe connecting their lower ends, and sprinkler heads at the upper ends of the standards; of a valve in each standard, opening and closing buckets carried by the valve stem at opposite sides thereof, two control pipes leading from the first standard at a point above its valve, one of them leading to a point above the closing bucket of the second standard and the other to a point above the opening bucket of the third standard, two similar pipes leading from the second standard, one of them leading to a point above the opening bucket of the first standard and the other to a point above the closing bucket of the fourth standard, two similar pipes leading from a point above the valve of the third standard, one of them to a point above the closing bucket of the first standard and the other to a point above the opening bucket of the fifth standard, and a similar disposition of the control pipes throughout all the standards of the series whereby the initial opening of the valve in the first standard automatically opens the valve in the third, the latter in turn automatically closes the first and opens the fifth, this in turn automatically closes the third and opens the seventh, and so on through the odd numbers of the series and thence backward through the even numbers of the series to the point of starting.

4. In an automatic sprinkling system, the combination with a series of upright standards having sprinkler heads, and a feed pipe connecting the lower ends of the standard; of a valve casing within each standard a valve mounted on a rock shaft therein, a cross head carried by the outer end of said shaft, opening and closing buckets mounted on the opposite ends of said cross head, and two control pipes leading from each standard at a point above its valve, one to a point above the closing bucket of another standard and the other to a point above the opening bucket of a third standard.

5. In an automatic sprinkling system, the combination with a series of upright standards having sprinkler heads, and a feed pipe connecting the standards; of a valve casing within each standard, the casing having two lateral bosses above its valve seat, an oscillating shaft mounted within said casing, a valve connected thereto, a rocking cross head attached to said shaft, opening and closing buckets carried by the opposite ends of said cross head, and two control pipes connected with the outer ends of said bosses, one leading to a point above the closing bucket of another standard and the other to a point above the opening bucket of a third standard.

6. In an automatic sprinkling system, the combination with an upright standard having a sprinkler head and beneath the same a valve casing, a rock shaft through the latter, a valve head thereon, a right-angular cross head secured to the outer end of said shaft, and buckets mounted on the arms of said crosshead and having respective inlets disposed at right angles to each other and respective outlets also at right angles to each other, each outlet being at right angles to its inlet; of control pipes leading from a suitable source with their delivery ends standing at points respectively above the inlets of said buckets when the latter are in their upright position, and means for controlling the supply of water through said pipes.

7. In an automatic sprinkling system, the combination with an upright standard having a sprinkler head and beneath the same a valve casing, a rock shaft through the latter, a valve head thereon, a right-angular cross head secured to the outer end of said shaft, buckets mounted on the arms of the cross head and having respective inlets disposed at right angles to each other and respective outlets also at right angles to each other, each outlet being at right angles to its inlet, and two sprinklers each connected at one end with the outlet of one of said buckets and having perforations in a side wall which is at right angles to said end; of control pipes leading from a suitable source with their delivery ends standing at points respectively above the inlets of said buckets when the latter are in their upright position, and means for controlling the supply of water through said pipes.

8. The herein described automatic sprinkling system comprising a series of standards disposed around an area which is to be sprinkled, a sprinkler head carried by each standard, a separate valve controlling the supply of water to each standard, means for automatically opening each of said valves, means controlled by the flow of water through each standard for automatically closing the valve of another standard, and means for timing the effective action of said controlling means.

9. The herein described automatic sprinkling system comprising a series of standards disposed around an area which is to be sprinkled, a sprinkler head carried by each standard, a separate valve controlling the supply of water to each standard, means controlled by the flow of water through each standard for opening the valve of another standard, means controlled by the flow of water through each standard for closing the valve of another standard, and means for timing the effective action of each of said closing means to occur later than that of the opening means for the corresponding valve.

10. The herein described automatic sprinkling system comprising a series of standards disposed around an area which is to be sprinkled, a sprinkler head carried by each standard for delivering weater to a considerable distance therefrom, a valve in each standard, a tilting device carried by each standard and connected with its valve for opening and closing the latter, sprinkling buckets carried by said device for sprinkling an area closer to the standard, and control pipes leading from other standards to points above said buckets, one of them being restricted in size so that its time of effective action is different from that of the other.

11. The herin described automatic sprinkling system comprising a series of standards disposed around an area which is to be sprinkled, a sprinkler head carried by each standard for delivering water to a considerable distance therefrom, a valve in each standard, a tilting device carried by each standard and connected with its valve for opening and closing the latter, sprinkling buckets carried by said device for sprinkling an area closer to the standard, and hydraulic connections between two of the other standards and the one referred to for delivering water to said buckets at different times.

In testimony whereof I have hereunto set my hand in presence of two subscribing witnesses.

GEORGE ZINT.

Witnesses:
C. A. STUEVE,
OLINDA KLEIN.